Patented Aug. 11, 1936

2,050,583

UNITED STATES PATENT OFFICE 2,050,583

SULPHURIZED ALIPHATIC HALOGEN COMPOUNDS AND PROCESS OF MAKING SAME

Ludwig Orthner, Leverkusen-I. G.-Werk, and Heinrich Freudenberger, Frankfort-on-the-Main-Hochst, Germany, assignors to I. G. Farbenindustrie Aktiengesellschaft, Frankfort-on-the-Main, Germany No Drawing. Application February 14, 1935, Serial No. 6,588. In Germany February 17, 1934

9 Claims. (Cl. 260—17)

The present invention relates to new high molecular products containing sulphur in combination and the process of preparing the same.

High molecular substances resulting from the interaction of soluble sulphides particularly alkali metal polysulphides with organic compounds containing methylene groups, which are linked to negative radicals, for instance, ethylene dichloride, are known to exhibit properties resembling those of leather or natural rubber. These products are, furthermore, distinguished by their excellent swelling resistance towards aliphatic and aromatic hydrocarbons, and can, in consequence thereof, be employed for oil pipes and so on. However, most of the said condensation products display a disagreeable odor which can be such as to prevent the practical use of these compounds. Obviously, the unpleasant odor is due to the presence of easily volatile by-products, which, moreover, effect a porosity of the vulcanizates obtainable when heating the products. Attempts at the removal of this disagreeable odor encounter great difficulties owing to the insolubility of the said products in organic solvents and to their tough and strongly coherent form. It is, therefore, a problem to find new condensation products of similar leather- or rubber-like properties, which are, nevertheless free from the disagreeable smell inherent to the hitherto known products.

In accordance with the present invention one solution of this problem has been found in the high molecular products resulting from the interaction of water soluble sulphides selected from the group consisting of alkali metal, ammonium and alkaline earth metal sulphides, particularly polysulphides, with polyhalogenated compounds having the halogens attached to carbon atoms and containing in combination the group $$\diagdown_{\diagup}CO$$

one or several times. Our new compounds are prepared in a manner known per se by causing interaction between sulphides and halogen compounds of the character described in the presence of diluents, particularly water or alcohol. The reaction can be accelerated by the application of higher temperatures such as up to about 100° C., though heating of the mixture can be dispensed with in most cases owing to the heat involved during the reaction. When working in the presence of water, we prefer to add emulsifying agents, such as sodium di-iso-butylnaphthalene sulphonate, condensation products of fatty acids with aliphatic amino-alkyl-sulphonic acids, condensation products of oleic acid chloride with amino-carboxylic acids, such as hydrolyzed albumen; another preferred form of our invention resides in carrying out the reaction in the presence of water while adding superficially active solid dispersing agents, such as freshly precipitated barium sulphate, magnesium hydroxide or aluminium silicate. Working in the presence of the said emulsifying agents or dispersing agents effects that the condensation products are obtained in form of a latex-like emulsion or a suspension, which can be purified and worked up in a manner similar to that customarily employed in the natural rubber industry.

The preferred sulphides employed in our present process are polysulphides, it being understood that the mechanical properties of our condensation products can be controlled by varying the sulphur content of the sulphides in such a manner that products of an increased hardness are obtained with an increase of the sulphur content. As examples of the polyhalogenated compounds of the character described there may be mentioned esters of polyvalent alcohols, such as glycerine and halogenated fatty acids, such as mono- or dichloroacetic or propionic acid, esters of halogenated alcohols with polybasic acids, carbonic acid esters of halogenated alcohols, esters of halogenated alcohols with halogenated acids, polyhalogenated ketones, amides of halogenated acids and polyamines, urea derivatives containing halogenalkyl groups attached to nitrogen, amides of halogenated acids and halogenalkyl amines or amides of polycarboxylic acid and halogenated amines. In case of urea derivatives the oxygen atom of the carbonyl group can be replaced by a sulphur atom without deparing from the sense of our invention; therefore, thiourea derivatives are intended to be embraced by the claims calling for the use of compounds containing the group $$\diagdown_{\diagup}CO$$

as obvious chemical equivalents thereof. Among the halogenated compounds serving as one of the reaction components, there have proved to be particularly suitable those which contain lower aliphatic chains since compounds which are free from fatty residues generally show a better resistance towards organic solvents of the type of benzene or benzines, though compounds containing a higher aliphatic chain such as a fatty acid residue, are not excluded from the scope of our invention.

As in the formation of our condensation products the halogen atoms are eliminated and the free bonds formed thereby combine with the sulphur of the sulphides, our products can be defined as "additive sulphides of alkylenes which contain the group $$\diagdown_{\diagup}CO"$$

As was pointed out above these products are characterized by their being free from a disagreeable odor. They are generally insoluble or at least difficultly soluble in aromatic and aliphatic hydrocarbons, it being understood that the qualities of the final products, such as the solubility and the physical properties can be regulated by varying the sulphur content and the reaction conditions.

These new compounds generally display plastic to elastic properties and can be transformed by a heat treatment analogous to the vulcanization of rubber into leather- to rubber-like products of excellent resistance towards organic solvents. The vulcanizates are, moreover, free from pores and are in this respect far superior to the vulcanizates obtainable from the plastic additive sulphides of alkylenes. It is to be understood that vulcanization can be effected either in the absence or in the presence of unvulcanized natural rubber.

The following examples illustrate the invention, without, however, limiting it thereto, the parts being by weight:—

Example 1

A mixture of 64 parts of glycerine-tris-monochloro-acetate and 30 parts of spirit is mixed while thoroughly stirring, with a concentrated aqueous solution of sodium trisulphide (contents 240 parts of crystallized $Na_2S$, 66 parts of sulphur in 100 parts of water). The sulphide solution added decolorizes with a strong raise of temperature until the reaction is finished. Thereupon the separated soft, rubber-like reaction product is thoroughly kneaded for some time while heating and in the presence of an excess of polysulphide, the aqueous alcoholic solution is decanted, the product washed with warm water in the kneader until the washing water is completely colorless and free of alkali, and then dried in the vacuo at 50–60° C. The product obtained is a tough, adhesive, greenish-yellow colored product, which is more or less capable of swelling in organic solvents.

Example 2

Into a mixture of 50 parts of glycerine-tris-mono-chloroacetate and 100 parts of spirit there are introduced while thoroughly kneading 140 parts of an alcoholic solution of sodium polysulphide. The polysulphide solution is obtained by boiling 240 parts of sodium sulphide, 66 parts of sulphur and 100 parts of spirit for 2 hours. The reaction, which immediately occurs, is strongly exothermic. While the polysulphide solution being slowly added decolorizes, the product separates in a yellowish-white, brittle rubber-like form. The reaction is finished when the color of the polysulphide does not change any more, whereupon heating of the reaction mass is maintained for 15–20 minutes while thoroughly kneading. The alcoholic solution is then filtered by suction, the product washed with hot water until free of alkali and then dried in the vacuum. The product forms a brittle, but in the heat becoming rubber-like, plastic, yellowish-white, odorless mass, which is absolutely insoluble in all organic solvents and which is especially suitable for the manufacture of oilproof articles alone or in admixture with natural rubber.

Example 3

To a mixture of 85 parts of the di-ester of glycol and dicholoacetic acid and 200 parts of spirit there are slowly added while stirring 240 parts of an aqueous 35% solution of sodium trisulphide. With a self-heating up to the boiling point a yellow, rubber-like compound is obtained, which is filtered off by suction from the yellowish brown solution, washed with spirit and then with water until free of alkali and then dried in the vacuum. The odorless product, which has more or less a rubber-like, elastic character, depending on the temperature, is neither soluble nor capable of swelling in organic solvents, and is, therefore, especially suitable for the manufacture of oilproof articles. The elasticity of the above product may be considerably improved by a combination with small amounts of natural rubber and subsequent vulcanization, without impairing its oilproof.

Example 4

Into a mixture of 50 parts of sorbit-tetra-mono-chloroacetate and 100 parts of spirit there are added while strongly kneading the mixture 140 parts of an alcoholic solution of sodium polysulphide, which is obtainable by boiling 240 parts of sodium sulphide, 66 parts of sulphur and 100 parts of spirit. The reaction occurs immediately and with a strong self-heating and decolorization of the polysulphide, a soft, rubber-like, yellowish product separates, which is neither soluble nor capable of swelling in all organic solvents. It is fibrous in the cold and of a rubber-like character in the heat.

Example 5

Into a solution of 240 grams of crystallized sodium sulphide, 48 grams of sulphur ($=Na_2S_{2,5}$) within 200 grams of water there are slowly introduced at a temperature of 50–60° C. 125 grams of symmetrical dichloroacetone. Heating to 60° C. is maintained for 3 hours. The purification of the precipitated mass is performed by a treatment with hot water. A plastic, odorless mass is thus obtained.

Yield: 100 grams.

Example 6

Into a solution of 35 grams of crystallized sodium sulphide, 14 grams of sulphur and 35 grams of water there are slowly added at room temperature 16 grams of monochloroacetic acid-beta-chloroethylester. The temperature of the reaction mixture rises gradually to 45° C. The purification of the precipitated mass is performed by a treatment with hot water or steam. A very soft, odorless, adhesive product is thus obtained.

Yield: 18 grams.

Example 7

Into a solution of 30 grams of crystallized sodium sulphide, 12 grams of sulphur ($=Na_2S_4$) in 30 grams of water there are slowly introduced at 50–60° C. 15 grams of monochloroacetic acid-beta-chloroethylamide. A soft, plastic mass separates, which is heated for another hour in the mother-liquor and washed with hot water for purification.

Yield: 24 grams.

Example 8

Into a solution of 38 grams of crystallized sodium sulphide, 16 grams of sulphur and 40 grams of water there are slowly introduced at 60° C. 21 grams of dichlorodiacetyl-ethylene-diamine. A crumbly, odorless mass is thus obtained.

Yield: 28 grams.

Example 9

A sodium tetrasulphide solution is obtained from 20 grams of crystallized sodium sulphide, 8 grams of sulphur and 20 grams of water. 9 grams of carbonic acid dichlorodiethylester are then poured into this solution at a temperature of between 80 and 90° C. The mixture is heated for 15 hours at the reflux condenser. 8 grams of a brittle mass are thus obtained, which latter becomes plastic when heated. The purification is performed in the usual manner.

Example 10

58 parts of a 3 times chloroacetylated castor oil dissolved in 100 parts of spirit, are slowly mixed while thoroughly stirring with 45 parts of a 35% solution of sodium trisulphide in spirit. The temperature of the mixture rises thereby and an oily product separates. By a subsequent heating for half an hour on the steam bath the oily mass becomes more viscous and finally solid like rubber; it is then separated from the residue and after a thorough kneading, it is washed with spirit and thereupon with hot water until the alkaline reaction has ceased. After drying a yellowish, elastic product is obtained, which may be combined on the rollers with the usual filling agents known in the rubber industry.

Example 11

To a solution of 60 parts of butylene glycol-bis-mono-chloroacetate and 58 parts of castor oil-tris-monochloroacetate in 200 parts of spirit there are added while stirring 220 parts of a 35% solution of sodium trisulphide in spirit. The reaction is finished by a heating on the vapor bath. The reaction product separated is firstly washed with hot spirit then with hot water and dried. A light-brown, elastic product, being insoluble in all organic solvents, is thus obtained, which is especially suitable for the manufacture of oilproof articles.

We claim:—

1. The process which comprises causing interaction between a water soluble sulphide selected from the group consisting of alkali metal, ammonium and alkaline earth metal sulphides and compounds having more than one reactive halogen atom in aliphatic combination and containing in combination the group $$\diagdown_{\diagup}CO$$

2. The process as claimed in claim 1, in which the water soluble sulphide is a polysulphide.

3. The process which comprises causing interaction between a water soluble sulphide selected from the group consisting of alkali metal, ammonium and alkaline earth metal sulphides and compounds having more than one reactive halogen atom in aliphatic combination and containing in combination the group $$\diagdown_{\diagup}CO$$

the reaction being performed in an aqueous medium in the presence of an emulsifying agent.

4. The process which comprises causing interaction between a water soluble polysulphide selected from the group consisting of alkali metal, ammonium and alkaline earth metal sulphides and dichloroacetone.

5. The process which comprises causing interaction between a water soluble polysulphide selected from the group consisting of alkali metal, ammonium and alkaline earth metal sulphides and a glycerine-tris-monochloroacetate.

6. The compounds which are substantially identical with those obtainable by the process which comprises causing interaction between a water-soluble sulphide selected from the group consisting of alkali metal, ammonium and alkaline earth metal sulphides and compounds having more than one reactive halogen atom in aliphatic combination and containing in combination the group $$\diagdown_{\diagup}CO$$

7. The compounds which are substantially identical with those obtainable by the process which comprises causing interaction between a water-soluble polysulphide selected from the group consisting of alkali metal, ammonium and alkaline earth metal polysulphides and compounds having more than one reactive halogen atom in aliphatic combination and containing in combination the group $$\diagdown_{\diagup}CO$$

8. The compounds which are substantially identical with those obtainable by the process which comprises causing interaction between a water-soluble polysulphide selected from the group consisting of alkali metal, ammonium and alkaline earth metal polysulphides and dichloroacetone.

9. The compounds which are substantially identical with those obtainable by the process which comprises causing interaction between a water-soluble polysulphide selected from the group consisting of alkali metal, ammonium and alkaline earth metal polysulphides and a glycerine-tris-monochloro-acetate.

LUDWIG ORTHNER.
HEINRICH FREUDENBERGER.